Jan. 26, 1954 J. RABINOW 2,667,237
MAGNETIC FLUID SHOCK ABSORBER
Filed Sept. 27, 1948 2 Sheets-Sheet 1
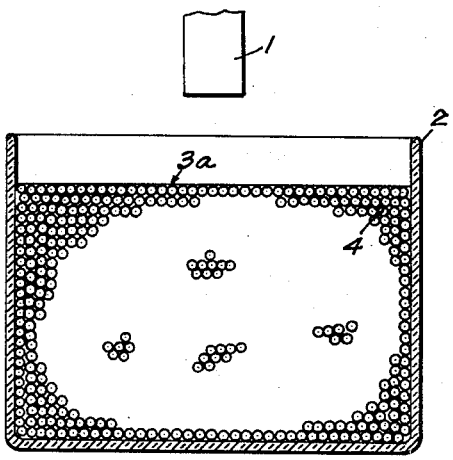
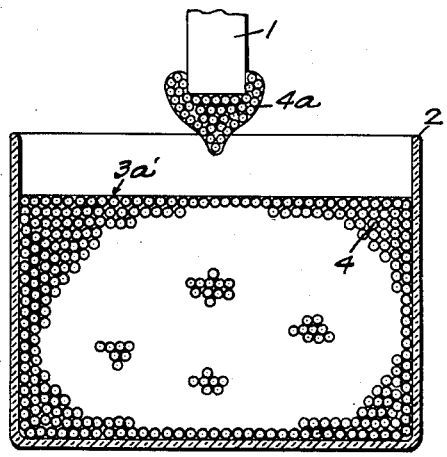
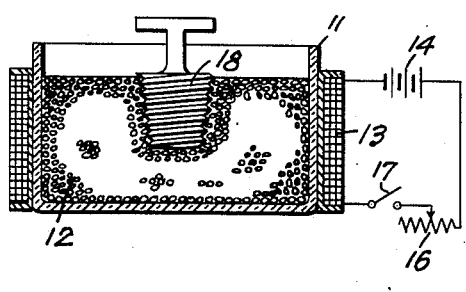
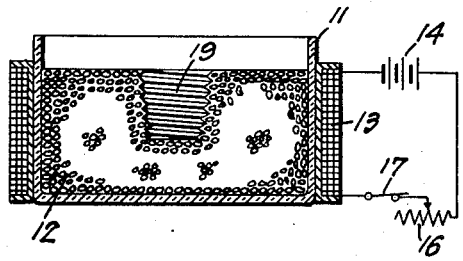
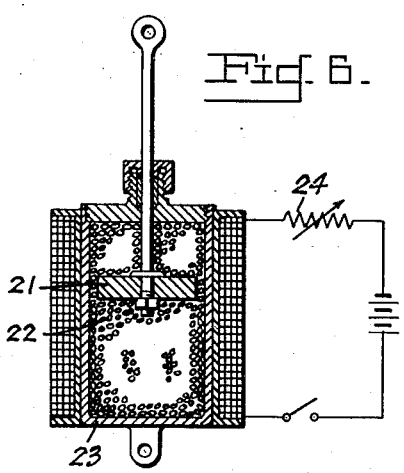
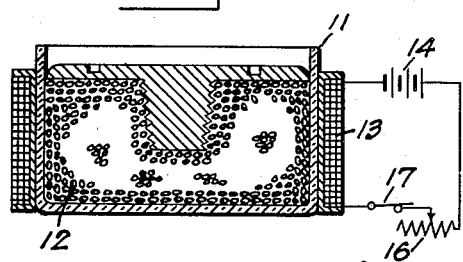
Inventor
Jacob Rabinow Jan. 26, 1954   J. RABINOW   2,667,237
MAGNETIC FLUID SHOCK ABSORBER
Filed Sept. 27, 1948   2 Sheets-Sheet 2

Inventor
Jacob Rabinow

Patented Jan. 26, 1954

2,667,237

UNITED STATES PATENT OFFICE 2,667,237

MAGNETIC FLUID SHOCK ABSORBER

Jacob Rabinow, Washington, D. C.

Application September 27, 1948, Serial No. 51,402

13 Claims. (Cl. 188—88)

(Granted under Title 35, U. S. Code (1952), sec. 266)

The invention described in the following specification and claims may be manufactured and used by or for the Government for governmental purposes without the payment to me of any royalty thereon.

My invention relates to a variable viscosity magnetic material, the physical properties of which can be changed under the influence of a magnetic field. For example, the fluidity, or apparent viscosity can be altered by varying the strength of a permeating magnetic field, in such a manner that the material can be changed between a fluid-like consistency and a substantially solid consistency, depending on the instantaneous strength of the field. The ability of the material to adhere to a paramagnetic or ferromagnetic material is also controllable by varying the permeating magnetic field. The ability of the material to oppose mechanical penetration and to retain a given shape or conformation is also controllable by application of a magnetic field. It is a primary objective of my invention to provide such a material and means for controlling it at the will of an operator.

The invention came about because of the need for a fast-acting long-lived clutch wherein ease of control and positive action were required. These features were not afforded by any standard clutch available commercially or described in the literature of the art. I have determined that when a viscous fluid consisting, for example, of a mixture of iron particles in oil was acted upon by a magnetic field, such a mixture exhibited certain novel properties not obtainable with other known media; for example, viscosity of the mixture could be controlled from its normal rather fluid state through various degrees of fluidity until a virtual solidification was reached. Moreover, such fluid adheres very strongly to magnetized surfaces with which it is in contact and furthermore, exerts large friction forces on either magnetic or non-magnetic materials which are caused to move through it. Such use of the material is fully described in my copending application, Serial No. 783,426, filed October 31, 1947, now Patent No. 2,575,360, issued November 20, 1951.

The new material of my invention has many uses. For example, the magnetic fluid may be used in dashpots and similar motion retarding devices and the rate of operation of the devices may be electrically controlled by varying the strength of a magnetic field through the fluid. The effective viscosity of the fluid will be found to increase (with a properly constituted fluid) as the magnetic field intensity is increased, and vice-versa so that the rate of operation and the characteristics of the motion retarding devices may thus be electrically controlled without the use or interposition of mechanical elements.

Other uses of my magnetic fluid may be cited, though these are intended to illustrate rather than to limit the scope of my invention. In dashpots, the nature of my magnetic fluid permits control of the viscosity of such fluid and thereby regulation of the nature of the time-distance curve, the position-force curve, etc. Energy-absorbing devices consisting of a container filled with my magnetic fluid in which a vane is mounted to rotate, can be so designed that the amount of energy absorbed in the device can be controlled by means of a magnetic field applied through the container. In still another application, three-dimensional graphs can be made by locating a series of mechanical indicators in the desired positions and having a portion of such indicators immersed in my magnetic fluid. This magnetic fluid is also suitable for making molds as, for example, those into which plaster is to be cast. When used as a molding material, an object can be partially immersed in the fluid, a magnetic force applied and the object removed, the fluid then retaining an impression of the object's shape. When the casting material has been poured into a mold and allowed to solidify, the magnetic force may be removed, thus permitting the mold to flow away from the casting.

Other objectives and advantages of my invention will be apparent from the following description, in which:

Figure 1 is a schematic sectional representation of a body of iron particles mixed with fluid to form a mixture having the consistency of a thick fluid or mud, in the unmagnetized state;

Figure 2 is a similar schematic representation showing the effect of dipping a magnet into the fluid and withdrawing the magnet so that some of the fluid adheres thereto;

Figures 3–5 are schematic sectional representations showing the use of my magnetic fluid as a mold or matrix;

Figure 6 shows an arrangement whereby the magnetic mixture may be used in a variable viscosity dashpot or shock absorber;

Figure 11:
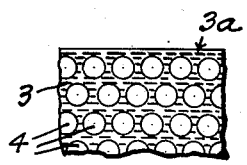
Figure 11 is an enlarged schematic section showing the separate particles of iron completely immersed in the fluid.

Referring to Figures 1, 2 and 11, a magnet 1 is shown at some distance from a beaker 2 in which there is a mixture of oil, 3, and iron powder 4 (shown greatly enlarged), the surface of the mixture being positioned approximately as shown at 3a. Figure 2 shows the result of dipping the magnet 1 into the mixture of oil and iron, in beaker 2. When the magnet is removed, a clump of the mixture 4a adheres to the pole of the magnet. The surface of the mixture 3a' in the beaker 2 is lowered, due to the removal of the material 4a. It is a characteristic of the material 4a that when adhered to a pole of the magnet 1, it appears visually and tactilely to be a solid of about the consistency of thick putty. As this material 4a is scraped off on the edge of the beaker 2, it immediately resumes its liquid state, flowing down the wall of the beaker and mixing readily with the iron oil mixture 3, 4.

The characteristic attraction of the magnetic fluid mixture to magnetized surfaces and the ability of this mixture to change viscosity in accordance with an easily operable external control of an applied magnetic field, makes it of particular importance in applications to machine design. One such application is in clutches where two relatively spaced members are locked together or released in relation to each other through the action of this material. Such a use of the material is fully described in my copending application previously mentioned.

Magnetizable liquids, particularly a liquid of this nature in which a small quantity of iron is mixed in mercury are known. It is also known that these earlier magnetic liquids were so designed that the physical properties of the material did not change under the influence of a magnetic field; such magnetic fluids were designed solely to respond positionally to the influence of a proximate magnet. Other liquids containing iron particles are known by me to have been used to indicate flaws in steel bodies but in this case very thin mixtures were used so that the iron particles were discretely visible.

The mixture which I have invented consists of small particles of paramagnetic or ferromagnetic material mixed with a fluid which may be a liquid or a coolant and antioxidant gas, or even a semi-solid such as grease. Although any such mixture is adapted for use in my invention, it is preferred for the purposes which I have described to use a mixture of approximately 90% iron powder and 10% light machine oil by weight. Although any iron or other magnetic powder will exhibit the desired effect, I have obtained very good results with carbonyl iron, as sold by General Aniline and Film Company, New York, as "Carbonyl Iron Powders" of which their grade E, 8 microns average size, has been found to be particularly satisfactory. The mixture of 90% iron and 10% oil results in a very slight excess of oil after settling over the iron particles under visual inspection. The resulting magnetic permeability of such mixtures is approximately eight as compared to vacuum.

In mixtures of this type, there is tendency of the iron to settle out of the oil if standing for long periods. As the mixtures are generally employed in machines, this presents no particular difficulty inasmuch as the first few motions made by the machine stir the mixture adequately. It is possible, however, to reduce or eliminate the tendency to settle by using a liquid of high specific gravity or by using a fluid of low surface tension, or by adding to oil a wetting agent to reduce its surface tension. I have found in practice that the use of a suspension medium of lower viscosity, such as kerosene, results in greater fluidity and ease of stirring of the mixture. Conversely, I have also found that the use of a suspension medium of higher viscosity such as grease, affords the advantage of becoming warm and fluid when energy is being dissipated in a device using my electromagnetic fluid, but becomes dense rapidly upon cooling, thus preventing the settling out of the iron particles. Greases with sharp breaks in their viscosity-temperature characteristics are particularly adaptable for such service. Where low temperatures are to be anticipated, silicone liquids may be used as the fluid portion of my mixture; this also provides the advantage of low surface tension where this is desirable.

While the 90% iron-10% oil mixture which I have previously described is most satisfactory for the applications to which I have put it, the proportions of iron can be greatly reduced where lower viscosities are found necessary. Such reduction in the proportion of iron results in smaller holding forces on bodies immersed in, or contacting, the magnetic fluid for any given magnetomotive force but by the use of strong magnetizing forces, the effect of the thinner mixture can be somewhat compensated. For applications where the velocities and magnitudes of motion are low, mixtures up to and including 100% iron can be used to advantage. Since all iron material is liable to pack into a solid immobile mass, this is best used where the normal operation will tend to keep the mass stirred up.

In Figures 3–5, the use of the magnetic fluid as a molding medium is shown. A container 11, containing a quantity of magnetic mixture 12, is surrounded by a coil 13 provided with current by a suitable source, such as battery 14, the field strength being controllable by rheostat 16 and switch 17. An object to be reproduced, shown as a screw 18, is inserted in the mixture while the latter is in a fluid condition. Switch 17 is then closed and a magnetic field of sufficient intensity passed through the mixture to solidify it. The screw is then unscrewed from the mixture leaving a cavity 19. Molten wax, plaster of Paris or other suitable material is then poured into the cavity and after it has set, the field strength is reduced to zero and the molded replica of the original object can be readily removed from the fluid; alternatively, in the above described case, the wax or other replica can be unscrewed from the mix without softening the latter and the mold can be used to make a number of replicas of the original. It is obvious that the described technique is also applicable to other known methods of casting, such for example as the "lost wax" method, or by the use of split molds in known fashion, more complex shape may be cast.

Figure 6 shows a combination dashpot or shock absorber arrangement in which plunger 21 moves through fluid 22 in casing of cylinder 23, there being sufficient space between the plunger and the wall of the cylinder for the passage of fluid 22 from one side of the plunger to the other side while the plunger is moving in the cylinder at a retarded rate of speed due to the presence of the fluid. It will be obvious that, other things being equal, the rate of translation or motion of the plunger in the fluid will decrease as the viscosity of the fluid increases and vice-versa. By translation is meant motion in which all the points of the moving body have at any instant the same velocity and the direction of motion, in contradistinction to rotation.

It is obvious that I do not intend to limit myself to the cylindrical shape of the illustrated casing and plunger as shapes will suggest themselves to one skilled in the art in infinite variety once the principle of controlled relative motion is shown.

The concept herein disclosed includes broadly all devices for controlling relative motion between spaced members such motion being normal to a surface of one member, the spacing between the members remaining constant.

By using my magnetic mixture and subjecting it to a magnetic field by means of a coil as before, the effective viscosity of the fluid can be varied by varying the intensity of the magnetic field, and the rate of effective retardation or shock absorption of the device can accordingly be controlled externally without the use of mechanical controls or elements. It will be apparent that cylinder 23 may be non-magnetic material. However, if the cylinder is of magnetic material, the flux should be made to flow between the plunger and the cylinder wall. In this case the retarding effect will be very pronounced.

Figure 7:
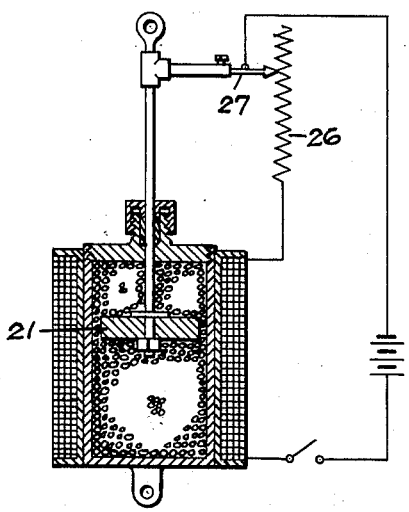
Figure 7 shows an arrangement similar to Figure 5, but with a modified time-velocity curve.

Figure 7 shows a modification of the idea described in Figure 6. In this figure the plunger 21 carries a rheostat arm 27 which decreases the resistance of rheostat 26 as the plunger goes down. This increases the current and therefore the field strength and makes the effective resistance to motion of the plunger 21 a function of its distance of travel. It is obvious that by this method and the use of suitably designed resistors, any desired characteristic can be obtained.

Figure 8:
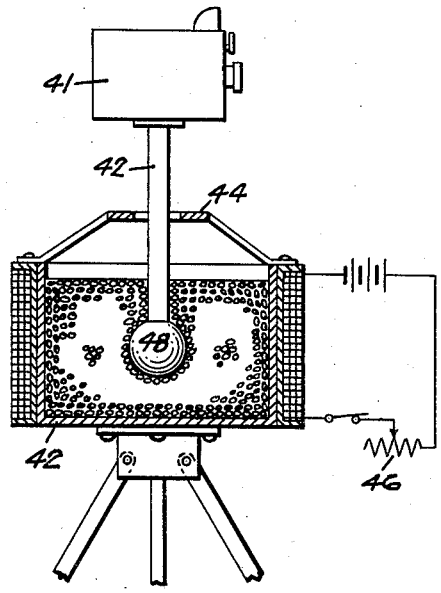
Figure 8 shows the use of my new material in a final adjustment device.

Figure 8 shows the use of my mixture in a final adjusting device or pointer devices such as a telescope, camera, etc. Such a device, for example, a camera 41 may be fixed to a shaft 42 carrying a ball 48 which is located in a container of magnetic controllable mixture as in the preceding examples. A spider 44 is shown loosely supporting the camera so that it will not fall and be damaged when the mixture is in the fluid state. The container 42a may be fixed to a stationary support in case of stationary apparatus, or may be carried by a tripod in case of portable apparatus, in which latter case a local portable battery will be used as the supply source. Rheostat 46 provides for adjustment of the mixture from a fluid to a solid state. With the fluid in a solid state, the camera can be freely moved with one hand, keeping the other hand on the rheostat, until an approximate adjustment is made. The mixture is then partially solidified, and the camera more closely adjusted, which will be found to be very easy, as the camera will resist rapid large motions but will be readily movable a small distance. This process may be continued until the camera is exactly positioned, when the mix is solidified to maintain the camera in the desired position. It will be obvious that the technique is applicable to a large variety of final positioning devices. It will be noted that it permits limited motion of the adjusted devices in any direction, plane or angle to exactly position the same, and then fix it in said position by a force uniformly applied in all directions without the slightest perceptible jar or displacement.

Figure 9:
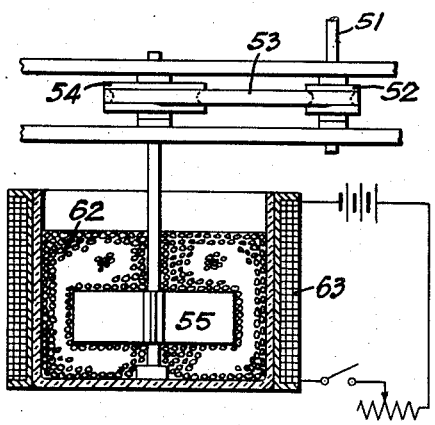
Figure 9 shows an application of my invention in an energy dissipating or braking device.

Figure 9 shows the application of my invention to an energy dissipating or braking device. The energy to be dissipated is transmitted through shaft 51 and pulley 52, and by means of belt 53 and second pulley 54 to a paddle wheel 55 suspended in fluid 62. A coil or winding 63 is provided with a controllable source of current as before to vary the resistance of the mixture 62 to rotation of paddle wheel 55 and to therefore control the rotation or energy dissipation of the latter.

Figure 10:
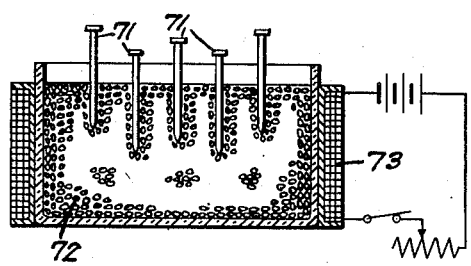
Figure 10 shows the use of my invention in connection with a 3-dimensional graphic device.

Figure 10 shows the use of my invention in connection with a 3-dimensional graphic device. Pins 71 are thrust into a container of magnetic mixture 72 controlled by a magnetic field produced by winding 73 in the usual fashion. The pins 71 are manually adjusted so that the positions of their heads give a 3-dimensional graphic representation of any desired function. Any changes in value of the function can be represented by changing the position of the heads of pins 71; this can be done manually by softening the magnetic mixture slightly to the point where a pin can be readily withdrawn and its position changed without affecting the positions of any other pins. After the manual adjustments are completed the material can again be hardened by application of a suitable magnetic field intensity, and the new position will then be retained indefinitely.

The foregoing are only a few of the many uses to which my new magnetic material can be put. It will be obvious that the new material can be employed wherever its particular characteristics are needed and particularly the characteristic of being changeable instantly and under complete electrical control from a fluid through all stages of increasing viscosity to a fixed, non-fluid material which will retain its solid characteristics as long as the magnetic field intensity is held at a suitable level.

In this specification and claims, the term "apparent viscosity" is employed to describe the resistance offered by my material to change of shape or to relative motion of its parts, including relative motion between the material of my invention and a retaining surface even without change of shape. This latter condition may occur, for example, when the material is used in a clutch, since in that case there will be no apparent change in shape or relative motion of the particles of the material itself, yet its resistance to movement relative to the mechanical members may be increased at will. It is believed that the "apparent viscosity" of my material also differs from the viscosity of ordinary fluids in that it includes a certain amount of internal magnetic attraction between the ferromagnetic particles which must be overcome when the particles are moved relative to one another. This is, of course, in addition to the usual factors affecting viscosity. I am not certain what all of the factors are which affect the "apparent viscosity" of my material and I therefore do not, in the interest of accuracy, use the term "viscosity" alone in this connection; however, the apparent viscosity of my material can be measured in all stages by means similar to those employed to measure viscosity, and it behaves to all appearances essentially like ordinary viscosity, except that the apparent visocity under the influence of a magnetic field will be found to be anisotropic, that is, I have noted that the apparent viscosity in the direction of the magnetic field is less than the apparent viscosity normal to the magnetic field. A further difference is that some finite value of force is usually necessary to start motion in this material when magnetized. This effect is more nearly analogous to dry friction than to viscous drag. In using the term "apparent viscosity" I mean to embrace all stages of consistency from a very thin fluid to a completely non-fluid material.

I claim:

1. A device for controlling the relative motion between two members the first of said members comprising a cylinder and the second of said members comprising a plunger movable within and spaced from said cylinder, a mass of contiguous discrete paramagnetic particles in the said cylinder and extending to the said plunger, means for applying a force to move the said plunger relative to the said cylinder, a coil surrounding said cylinder, a source of electrical energy connected to excite said coil and a rheostat operable by said motion of said plunger to vary the excitation of the said coil.

2. A device for controlling the relative motion between at least two members the first of said members having a cylindrical surface of revolution, the second of said members movable relative to and spaced from the said first member and having a surface of revolution opposed to the first mentioned surface of revolution, a magnetic fluent material extending between said members, means for applying a magnetic field to said material to control its fluency, means for applying a force to move said second member in a direction parallel to the axis of the said surface of revolution whereby the said motion is opposed by the adhesive consistency of the said fluent material, the spacing between the said opposed surfaces of revolution remaining constant during such motion.

3. A device for controlling the relative motion between at least two members the first of said members having a cylindrical surface of revolution, the second of said members movable relative to and spaced from the said first member and having a cylindrical surface of revolution opposed to the first mentioned surface of revolution, a magnetic fluent material extending between said members, means external to said members for applying a magnetic field to said material to control its fluency, means for applying a force to move said second member in a direction parallel to the axis of said surface of revolution whereby such notion is opposed by the adhesive consistency of the said fluent material, the spacing between the said opposed surfaces of revolution remaining constant during such motion.

4. The invention as set forth in claim 3 wherein said fluent material comprises a mass of contiguous discrete paramagnetic particles.

5. The invention as set forth in claim 3 wherein said fluent material comprises a mass of contiguous discrete paramagnetic particles and a lubricant.

6. The invention as set forth in claim 3 wherein said first member is fixed in position.

7. The invention as set forth in claim 6 wherein the said first member comprises a container for said magnetic fluent material.

8. The invention as set forth in claim 7 wherein the said means for applying a magnetic field comprises a coil and a source of electrical energy to energize such coil.

9. Means for transmitting force between relatively movable members comprising a first movable element, a first paramagnetic member secured thereto for motion therewith, a second paramagnetic member, said members having cylindrical surfaces opposed to and spaced from each other, a mass of contiguous discrete relatively movable paramagnetic particles in the space between said opposed surfaces, magnetic field-producing means for magnetizing the said paramagnetic elements and at least a portion of the said mass of paramagnetic particles in the space between the elements, means for moving the said elements relative to each other along a path parallel to the axis of revolution of the said spaced surfaces whereby the distance between the said spaced surfaces remains substantially constant during such motion.

10. A device for controlling the relative motion between at least two members, the first of the said members comprising a container, the second of said members at least partially located within said container, a magnetic fluent material in said container extending at least between the said two members, means for applying a magnetizing force to said material to control its fluency, means for translating said second member along a fixed path relative to said container, said container having at least a portion of its internal surface entirely composed of elements parallel to the direction of motion of said second member, said internal surface surrounding the said second member, said container having additional internal surfaces to confine said fluent material so that said fluent material is deformed during said motion of said second member.

11. The invention according to claim 10 comprising the said container being in the form of a cylinder.

12. The invention according to claim 10 where the said fluent material comprises a mass of contiguous discrete paramagnetic particles and a lubricant.

13. The invention according to claim 12 wherein the container comprises a cylinder, the second member comprises a plunger within and spaced from said cylinder, and said means for applying the magnetizing force comprises a coil coaxial with said cylinder and a source of electrical energy.

JACOB RABINOW.

References Cited in the file of this patent

UNITED STATES PATENTS

| Number | Name | Date |
|--------|------|------|
| 711,123 | Rhoades | Oct. 14, 1902 |
| 811,654 | Murphy | Feb. 6, 1906 |
| 1,019,260 | Lanning | Mar. 5, 1912 |
| 1,112,411 | Ackley | Sept. 29, 1914 |
| 1,114,691 | Herz | Oct. 20, 1914 |
| 1,494,070 | MacKnight | May 13, 1924 |
| 1,671,658 | Travers | May 29, 1928 |
| 1,695,041 | Elmen | Dec. 11, 1928 |
| 1,963,496 | Land | June 19, 1934 |
| 1,965,649 | Jaumann | July 10, 1934 |
| 2,106,882 | Betz | Dec. 12, 1936 |
| 2,138,974 | MacDonald | Dec. 6, 1938 |
| 2,216,600 | Moore | Oct. 1, 1940 |
| 2,428,471 | Pruitt et al. | Oct. 7, 1947 |
| 2,525,571 | Winther | Oct. 10, 1950 |
| 2,575,360 | Rabinow | Nov. 20, 1951 |